July 8, 1947.  C. G. SONTHEIMER ET AL  2,423,526
REFLECTOMETER FOR WAVEGUIDE TRANSMISSION LINES
Filed March 30, 1944
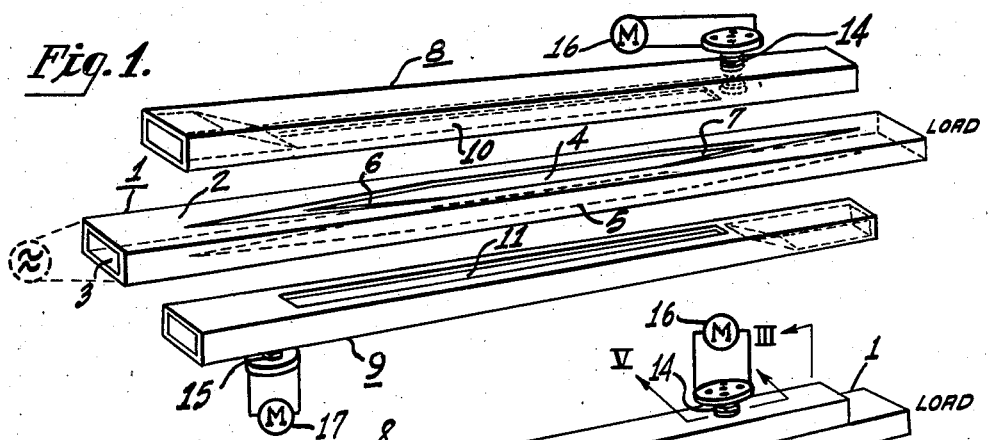
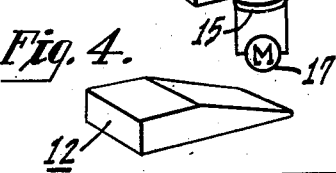
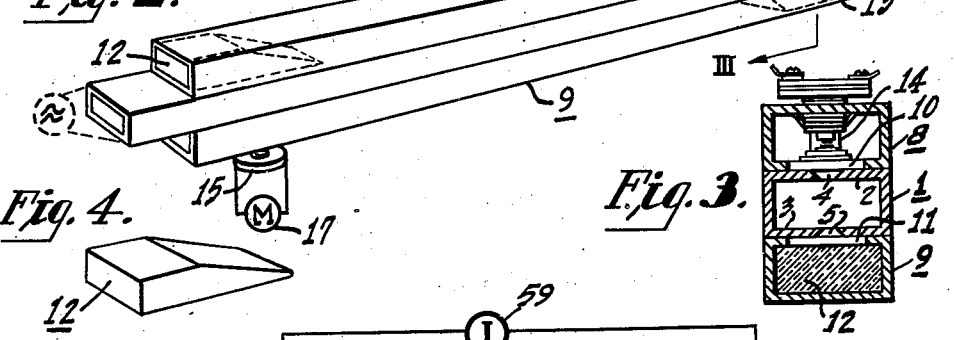
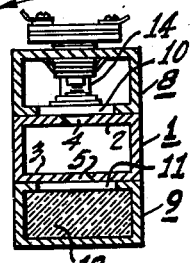
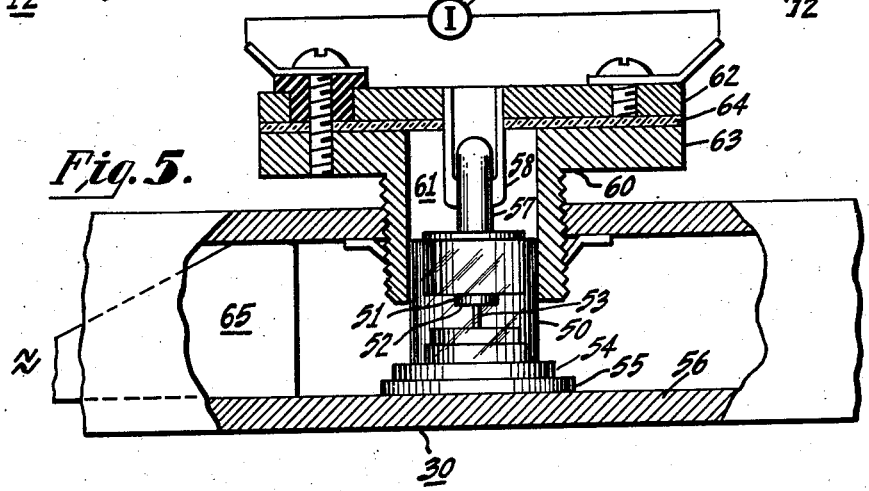
INVENTORS
CARL G. SONTHEIMER
& NATHANIEL I. KORMAN
BY
ATTORNEY Patented July 8, 1947

2,423,526

UNITED STATES PATENT OFFICE 2,423,526

REFLECTOMETER FOR WAVEGUIDE TRANSMISSION LINES

Carl G. Sontheimer, Haddonfield, and Nathaniel I. Korman, Camden, N. J., assignors to Radio Corporation of America, a corporation of Delaware Application March 30, 1944, Serial No. 528,785

6 Claims. (Cl. 171—95)

1

This invention relates generally to high frequency wave transmission and more particularly to non-frequency selective reflectometers for measuring directly the magnitudes of traveling waves in high frequency waveguide transmission lines.

One of the most useful measurements customarily made on transmission lines or waveguides is the measurement of the standing wave ratio. The same information obtainable from standing wave ratio measurements may be obtained by measuring separately the forward and backward-traveling wave magnitudes. Ordinarily, measurements of the standing wave ratio require the use of a movable wave probe in order to determine the wave magnitude at various predetermined points along the transmission line. Movable elements in ultra-high frequency coaxial transmission lines and waveguides involve difficulties due to imperfect electrical contact between the transmission line and the movable probe element which may introduce considerable error in the standing wave measurements. Furthermore, standing wave ratio measurements heretofore have necessitated a series of at least two consecutive measurements of wave magnitude at different points along the transmission line.

Heretofore, attempts to measure separately the magnitudes of the forward and backward-traveling waves without the necessity of the adjustment of a probe element have been limited to measurements at a single frequency.

The instant invention permits separate measurements of the magnitudes of forward and backward-traveling waves in a waveguide without the limitation of frequency selectivity in the measuring apparatus. The system is based broadly upon the same principles as the "Beverage," or "Wave," antenna, wherein waves traveling in substantially only one direction in a main transmission waveguide are operative upon the measuring apparatus. The main transmission waveguide is coupled loosely, through relatively long apertures, to two auxiliary measurement waveguides, each of which are responsive to waves traveling in only one of two different directions, whereby one auxiliary guide measures the magnitude of forward-traveling waves and the other the magnitude of backward-traveling waves.

The accuracy of the measurement apparatus may be made substantially independent of the operating frequency by employing substantially aperiodic coupling means between the transmission and measurement waveguides. The coupling means include narrow, tapered slots having

2 lengths at least one-half, and preferably several, wavelengths at the lowest desired operating frequency.

Among the objects of the invention are to provide an improved method of and means for measuring standing waves on a high-frequency transmission line. Another object of the invention is to provide an improved method of and means for measuring separately the forward and backward-traveling waves on a super-high-frequency waveguide transmission circuit. Another object of the invention is to provide an improved reflectometer for measuring the magnitudes of standing waves in a waveguide transmission system. A further object of the invention is to provide an improved method of and means for detecting and measuring standing waves in a waveguide transmission system.

Other objects of the invention include improved methods of and means for measuring forward and backward-traveling waves in a super-high-frequency waveguide transmission system by employing longitudinally fixed energy pickup means for said measurements. Another object of the invention is to provide an improved method of and means for measuring standing waves in a high-frequency waveguide transmission system wherein said measurements are substantially independent of the frequency of said standing waves. A further object of the invention is to provide an improved method of and means for measuring standing waves in a high frequency waveguide transmission line wherein the measuring apparatus is substantially reactive.

The invention will be described in greater detail by reference to the accompanying drawings of which Figure 1 is an exploded perspective view of a preferred embodiment of the invention, Figure 2 is an assembled perspective view of said embodiment of the invention, Figure 3 is a cross-sectional elevational view of the device of Figure 2 taken along the section line III—III of Figure 2, Figure 4 is a perspective view of a substantially reflectionless load device forming a part of the device, and Figure 5 is a cross-sectional elevational view of a portion of the embodiment of the invention shown in Figure 2 taken along the section lines V—V. Similar reference characters are applied to similar elements throughout the drawings.

Referring to Figures 1, 2 and 3, a preferred embodiment of the invention is adapted to measure the magnitudes of forward and backward-traveling standing waves in a main waveguide 1 having a cutoff frequency below that of the minimum frequency to be transmitted and measured.

The oppositely-disposed wide faces 2, 3 of the main waveguide 1 include centrally located narrow tapered slots 4, 5, respectively, each of said slots terminating in tapered end slot portions 6, 7. The slots are tapered to prevent wave reflections therein which would result in inaccurate wave magnitude measurements. First and second auxiliary rectangular waveguides 8, 9 include relatively wider rectangular slots 10, 11, respectively, which also may be tapered at their edges, and are juxtaposed with respect to the tapered slots 4, 5 of the main waveguide 1, whereby a small proportion of the energy transmitted by the main waveguide 1 is coupled to the first and second auxiliary waveguides 8, 9, respectively. The lengths of each of the slots exceeds one-half, or preferably several, wavelengths at the lowest desired operating frequency, whereby the coupling between the main and auxiliary waveguides is substantially aperiodic or non-frequency-selective. Although satisfactory operation as a reflectometer will be obtained without tapering the slotted end portions, it is desirable that they should exceed one wavelength in order to reduce to a minimum reflections in the guide 3. It should be understood that either inductive or capacitive coupling may be employed between the main and auxiliary waveguides, providing that the coupling interval is extensive with respect to the operating wavelengths.

The first auxiliary waveguide includes a first substantially reflectionless terminating tapered plug resistor 12, having a resistance matching the surge impedance of the first auxiliary waveguide 8, and disposed at the end of the waveguide nearest the generator end of the main waveguide 1. A perspective view of the tapered plug resistor is shown in Fig. 4. It may comprise a phenolic composition or rubber base having a predetermined percentage or coating of a resistive material, such, for example, as graphite or carbon. The taper should be as long as necessary to minimize wave reflections. Similarly, the second auxiliary waveguide 9 includes a second substantially reflectionless terminating tapered plug resistor 13, having a resistance matching the surge impedance of the second auxiliary waveguide and disposed at the end of said second auxiliary waveguide nearest the load end of the main waveguide 1.

The first auxiliary waveguide 8 also includes, at its end nearest the load end of the main waveguide 1, a first wave detector 14 which may be of the type described hereinafter in Figure 5. Similarly, the second auxiliary waveguide 9 includes, at its end nearest the generator end of the main waveguide 1, a second wave detector 15 which also may be of the type described hereinafter in Figure 5.

Forward-traveling waves in the main waveguide 1 (traveling from left to right in the drawing, that is, from the generator to the load) will be coupled to the first auxiliary waveguide 8, and the magnitude thereof may be indicated on a first meter 16, in response to currents derived from the first detector 14. Similarly, backward-traveling waves (from the load to the generator) will be coupled to the second auxiliary waveguide 9, and the magnitudes thereof may be indicated on a second meter 17, in response to the currents derived from the second detector 15. Wave energy traveling in the opposite directions in each of the auxiliary waveguides will not affect the corresponding wave detectors, but will be absorbed by the matching resistor plugs. The device will provide accurate indications of the forward and backward-traveling wave magnitudes in the main waveguide 1 for substantially all frequencies which may be transmitted efficiently through the main waveguide.

It should be emphasized that the tapered resistor plugs 12, 13 must closely match the surge impedance of the auxiliary waveguides 8, 9, and must be tapered effectively to eliminate wave reflections to the corresponding crystal detectors which would introduce errors in the wave magnitude measurements. In order that the tapered resistor plug may provide a substantially perfect termination over a wide band of operating frequencies, its characteristics must be predominantly resistive. However, it is not essential that the crystal detectors be matched to the waveguides.

If the measurement of waves traveling in only one direction through the main waveguide 1 is required, the second auxiliary waveguide 9 may be omitted. Furthermore, measurement of waves traveling in both directions along the main waveguide 1 may be obtained with only one auxiliary waveguide, providing substantially reflectionless detectors and indicators are disposed at opposite ends of the auxiliary waveguide. Detectors of the type described hereinafter in Figure 5 may be made quite reflectionless by interposing a tapered attenuating plug 65, having the conformation of Figure 4 in the auxiliary waveguide as indicated in dash lines in Figure 5. The plug 65 may be of Bakelite or other dielectric material and should be disposed between the coupling slot and the wave detector.

Figure 5 is illustrative of a type of filtered microwave crystal detector suitable for the detection of microwaves within a waveguide transmission system. This device is described and claimed in the copending U. S. application of Wendell L. Carlson, Ser. No. 507,755, filed October 26, 1943. Briefly, it includes a crystal cartridge 50 enclosing a silicon crystal 51 having a knife edge 52 in contact with a tungsten "catwhisker" 53. One end terminal 54 of the crystal assembly is retained with a contacting ring 55 secured to the inner wall 56 of the main waveguide 1. The remaining contact 57 of the crystal assembly engages contact springs 58 which are connected to one terminal of an indicator 59. The remaining terminal of the indicator 59 is connected to a cylindrical conductive shell 60 which provides an adjustable anti-resonant cavity 61. The indicator may be any suitable D.-C. measuring instrument. If desired, it may include amplification to increase its sensitivity to the rectified currents derived from the crystal detector.

The capacitor formed between a conductive plate 62 connected to the contact springs 58 and the enlarged cylindrical portion 63 of the anti-resonant cavity means, which elements 62, 63 are separated by a mica sheet 64, provides effective by-passing of ultra-high frequency voltage components across the indicator 59. Thus the anti-resonant cavity and by-pass capacitor effectively isolate microwave currents from the indicator circuit. If desired, the volume of the anti-resonant cavity means may be adjusted to provide maximum signal sensitivity at a particular frequency. However, any fixed adjustment thereof will provide accurate wave magnitude measurements over a wide range, since the cavity and capacitor merely provide an effective low-pass filter.

It will be seen that, in principle, the instant invention differs from known systems for high-frequency power and wave magnitude measurements in that it simultaneously incorporates all of the following desirable features. First, the device provides measurements which are not directly dependent upon frequency. Second, all transfer impedances, are reactive. Third, the accuracy of the system is independent of the wave detector impedance. Fourth, accurate measurements may be made at frequencies substantially higher than are practicable with other known systems. Fifth, due to the elimination of movable signal probes, measurement accuracy is substantially increased in the centimeter wave range.

Thus the invention described comprises an improved reflectometer for measuring the magnitudes of standing waves in a super-high-frequency waveguide transmission system, wherein said measurements are substantially independent of operating frequency and wherein simultaneous measurements of forward and backward-traveling waves are directly obtainable without the use of longitudinally movable wave probes.

We claim as our invention:

1. A reflectometer for measuring standing waves over a wide frequency range in a waveguide system including a main waveguide, second and third waveguides aperiodically coupled to said main waveguide over a distance exceeding a half wavelength at any operating frequency, first wave magnitude detecting means in said second waveguide responsive substantially only to forward-traveling waves in said main waveguide and second wave magnitude detecting means in said third waveguide responsive substantially only to backward-traveling waves in said main waveguide.

2. A reflectometer for measuring standing waves in a rectangular waveguide transmission system connecting a wave generator to a load including a main waveguide having a slot extending for a predetermined distance longitudinally along each of the wide faces thereof, second and third waveguides each having one slotted wide face juxtaposed in contact with said wide faces of said main waveguide and said slots being juxtaposed whereby wave energy in said main waveguide is coupled to said second and third waveguides, a first matching resistive load in the generator end of said second waveguide, first wave detecting means in the opposite end of said second waveguide to indicate the magnitudes of forward-traveling waves in said main waveguide, a second matching resistive load in the load end of said third waveguide, and second wave detecting means in the opposite end of said third waveguide to indicate the magnitudes of backward-traveling waves in said main waveguide.

3. Apparatus of the type described in claim 2 characterized in that the faces of at least two of said slots are tapered to minimize wave reflections therefrom.

4. A reflectometer for measuring standing waves over a wide frequency range in a wave transmission system including a main transmission line, a plurality of means each aperiodically and uniformly coupled to said main line over a distance exceeding a half wavelength at any operating frequency, first wave magnitude detecting means coupled to one of said aperiodically coupled means responsive substantially only to forward-traveling waves on said main line and second wave magnitude detecting means coupled to another of said aperiodically coupled means responsive substantially only to backward-traveling waves on said main line.

5. A reflectometer for measuring standing waves over a wide frequency range in a wave transmission system including a main transmission line, second and third transmission lines aperiodically coupled to said main line over a distance exceeding a half wavelength at any operating frequency, first wave magnitude detecting means coupled to said second line responsive substantially only to forward-traveling waves on said main line and second wave magnitude detecting means coupled to said third line responsive substantially only to backward-traveling waves on said main line.

6. The method of measuring standing waves on a radio frequency transmission system comprising aperiodically deriving energy from said system over a distance exceeding a half wavelength at any operating frequency, indicating the magnitude of forward-traveling waves on said system in response to a first portion of said aperiodically derived energy, and indicating the magnitude of backward-traveling waves on said system in response to a second portion of said aperiodically derived energy.

CARL G. SONTHEIMER.
NATHANIEL I. KORMAN.

REFERENCES CITED

The following references are of record in the file of this patent:

UNITED STATES PATENTS

| Number | Name | Date |
|---|---|---|
| 2,151,118 | King et al. | Mar. 21, 1939 |
| 2,375,223 | Hansen et al. | May 8, 1945 |

FOREIGN PATENTS

| Number | Country | Date |
|---|---|---|
| 545,936 | Great Britain | June 18, 1942 |

Disclaimer 2,423,526.—*Carl G. Sontheimer*, Haddonfield, and *Nathaniel I. Korman*, Camden, N. J. REFLECTOMETER FOR WAVEGUIDE TRANSMISSION LINES. Patent dated July 8, 1947. Disclaimer filed Mar. 30, 1949, by the assignee, *Radio Corporation of America*.

Hereby enters this disclaimer to claims 1, 2, 4, 5, and 6 except insofar as claim 2 is incorporated by reference in dependent claim 3 of said patent.

[*Official Gazette May 10, 1949.*]